(12) United States Patent
Odakura et al.

(10) Patent No.: US 10,335,895 B2
(45) Date of Patent: Jul. 2, 2019

(54) FRICTION STIR WELDING DEVICE AND FRICTION STIR WELDING METHOD

(71) Applicant: Hitachi Power Solutions Co., Ltd., Hitachi-shi, Ibaraki (JP)

(72) Inventors: Tomio Odakura, Ibaraki (JP); Koichi Ishiguro, Ibaraki (JP); Kenji Ando, Ibaraki (JP)

(73) Assignee: Hitachi Power Solutions Co., Ltd., Hitachi-shi (JP)

( * ) Notice: Subject to any disclaimer, the term of this patent is extended or adjusted under 35 U.S.C. 154(b) by 0 days.

(21) Appl. No.: 15/565,223

(22) PCT Filed: Apr. 7, 2016

(86) PCT No.: PCT/JP2016/061445
§ 371 (c)(1),
(2) Date: Oct. 9, 2017

(87) PCT Pub. No.: WO2016/163481
PCT Pub. Date: Oct. 13, 2016

(65) Prior Publication Data
US 2018/0071860 A1    Mar. 15, 2018

(30) Foreign Application Priority Data

Apr. 10, 2015  (JP) ................. 2015-081139

(51) Int. Cl.
*B23K 20/00* (2006.01)
*B23K 20/12* (2006.01)
(Continued)

(52) U.S. Cl.
CPC ........ *B23K 20/123* (2013.01); *B23K 20/1245* (2013.01); *B23K 20/1265* (2013.01);
(Continued)

(58) Field of Classification Search
CPC .............. B23K 20/1255; B23K 20/123; B23K 20/125; B23K 20/1245; B23K 20/122; B23K 20/1235
See application file for complete search history.

(56) References Cited

U.S. PATENT DOCUMENTS 6,421,578 B1 *  7/2002  Adams ................ B23K 20/123
                                                228/112.1
6,510,975 B2 *  1/2003  Enomoto ........... B23K 20/1255
                                                228/112.1
(Continued)

FOREIGN PATENT DOCUMENTS

CN    1490112 A      4/2004
JP    2003-80380 A   3/2003
(Continued)

OTHER PUBLICATIONS

International Search Report (PCT/ISA/210) issued in PCT Application No. PCT/JP2016/061445 dated Jul. 12, 2016 with English translation (Three (3) pages).
(Continued)

*Primary Examiner* — Erin B Saad
(74) *Attorney, Agent, or Firm* — Crowell & Moring LLP

(57) ABSTRACT

A friction stir welding device includes: a control device which causes a pin part to be inserted into members to be joined while causing a joining tool to rotate and which causes a joining head to move along a joint line via a robot main body; and an image pickup device which detects a junction deviation that is a deviation between the joining head and a direction along the joint line. Also, when a junction deviation is generated, this control device causes the joining head to move in a direction toward the joint line and thus resolves the junction deviation.

14 Claims, 14 Drawing Sheets

(51) Int. Cl.
  *B25J 9/10* (2006.01)
  *B25J 9/16* (2006.01)
  *B25J 11/00* (2006.01)
  *B23K 20/22* (2006.01)
  *B23K 20/26* (2006.01)
  *B23K 101/18* (2006.01)

(52) U.S. Cl.
  CPC .............. *B23K 20/22* (2013.01); *B23K 20/26* (2013.01); *B25J 9/1005* (2013.01); *B25J 9/1687* (2013.01); *B25J 9/1697* (2013.01); *B25J 11/005* (2013.01); *B23K 2101/18* (2018.08); *G05B 2219/40032* (2013.01)

(56) References Cited

U.S. PATENT DOCUMENTS

| | | | | |
|---|---|---|---|---|
| 6,732,900 | B2* | 5/2004 | Hansen | B23K 20/123 228/112.1 |
| 9,242,308 | B2* | 1/2016 | Peterson | B23K 20/126 |
| 9,358,634 | B2* | 6/2016 | Saitou | B23K 20/1245 |
| 2002/0145031 | A1* | 10/2002 | Hirano | B23K 20/123 228/112.1 |
| 2003/0047584 | A1 | 3/2003 | Okamoto et al. | |
| 2004/0074944 | A1 | 4/2004 | Okamoto et al. | |
| 2007/0181637 | A1 | 8/2007 | Hirano et al. | |

FOREIGN PATENT DOCUMENTS

| | | |
|---|---|---|
| JP | 2004-136331 A | 5/2004 |
| JP | 2004-337890 A | 12/2004 |
| JP | 2007-125598 A | 5/2007 |
| JP | 2011-200880 A | 10/2011 |
| WO | WO 2005/089998 A1 | 9/2005 |

OTHER PUBLICATIONS

Japanese-language Written Opinion (PCT/ISA/237) issued in PCT Application No. PCT/JP2016/061445 dated Jul. 12, 2016 (Seven (7) pages).
Chinese-language Office Action issued in counterpart Chinese Application No. 201680021018.7 dated Feb. 2, 2019 with English translation (20 pages).

* cited by examiner

FRICTION STIR WELDING DEVICE AND FRICTION STIR WELDING METHOD

TECHNICAL FIELD

The present invention relates to a friction stir welding device and a friction stir welding method.

BACKGROUND ART

Patent Literatures 1 to 3 each disclose a friction stir welding device (FSW device) which generates, with a rotating joining tool, a plastic flow in members to be joined and thus joins together the members to be joined.

Patent Literature 1 discloses a friction stir welding device having a structure suitable for three-dimensional joining in which a tool (joining tool) is attached to a five-axis machining center.

Patent Literature 2 discloses a friction stir welding device in which the depth of insertion or the like of a tool (joining tool) is controlled in such a way that the load and current of a main shaft motor for rotating the tool fall within a predetermined range, thus making it less susceptible to the influence of deformation of members to be joined.

Patent Literature 3 discloses a friction stir welding device configured in such a way that a distal end part of a joining tool inserted in members to be joined is swung, thus increasing the width of a plastic flow region and increasing the joining strength.

CITATION LIST

Patent Literatures

Patent Literature 1: JP 2004-136331 A
Patent Literature 2: JP 2003-080380 A
Patent Literature 3: WO 2005/089998 A1

SUMMARY OF INVENTION

Technical Problem

In friction stir welding, a joining tool is moved along a joint line (boundary line formed at a part to be joined) on members to be joined. Also, the joining tool, while rotating, is inserted into the members to be joined. Thus, the joining tool receives a reaction force (rotational reaction force) to the rotation, from the members to be joined. Therefore, an external force (Coriolis force) directed in a direction away from the joint line acts on the joining tool moving along the joint line.

A large friction stir welding device can restrain the Coriolis force with its large mass and can move the joining tool along a joint line. That is, by increasing the mass of the joining tool and peripheral apparatus and by moving the joining tool by a large and powerful drive device, it is possible to move the joining tool without being influenced by the Coriolis force. However, a small and lightweight friction stir welding device cannot sufficiently restrain the Coriolis force with its mass. Therefore, the moving joining tool may move away from a joint line and generate misalignment between the joint line and the joining tool (junction deviation).

In order to improve the quality of friction stir welding with a small friction stir welding device, it is necessary to correct the junction deviation caused by the Coriolis force.

However, Patent Literatures 1 to 3 include no description of a technique for correcting the junction deviation generated between the moving joining tool and the joint line.

For example, the correction mechanism disclosed in Patent Literature 1 is configured to change the position of the tool (joining tool) into a direction parallel to the axis of rotation of the tool, but is not configured to correct the junction deviation generated between the moving tool and the joint line.

The friction stir welding device of Patent Literature 2 is configured to change the depth of insertion of the tool (joining tool) according to the load factor of the main shaft of the main shaft motor for rotating the tool, but is not configured to correct the junction deviation generated between the joint line and the tool.

Also, the joining device (friction stir welding device) of Patent Literature 3 is configured to increase the joining strength by tilting the joining tool and thus broadening the plastic flow region, but is not configured to correct the junction deviation generated between joint line and the tool.

In this way, the friction stir welding devices disclosed in Patent Literatures 1 to 3 are not configured to be able to correct the junction deviation between the joint line and the joining tool caused by the Coriolis force acting on the rotating joining tool, and to move the joining tool accurately along the joint line to achieve high-quality friction stir welding. Therefore, there is room for improvement.

Thus, an object of the invention is to provide a friction stir welding device and a friction stir welding method that enable accurate movement of a joining tool and high-quality friction stir welding.

Solution to Problem

In order to solve the foregoing problems, according to the invention, a friction stir welding device includes: a joining head attached to a wrist head of a robot main body having multi-axis degrees of freedom; a drive device having the robot main body and capable of moving the joining head along a joint line where two members to be joined are joined together; a control device which supplies a motor drive current to an electric motor provided for the joining head, thus inserts a pin part of a joining tool into the members to be joined while rotating the joining tool, and also controls the drive device in such a way that the joining head moves along the joint line, thus performing friction stir welding of the two members to be joined; and a deviation detection device which detects a junction deviation which is a deviation between the joining head that is moving and a direction along the joint line. If the junction deviation exceeds a deviation limit value which is a predetermined maximum deviation at the time of the friction stir welding, the control device outputs to the drive device a position correction signal with a different polarity according to a difference indirection of misalignment between the joining head and the joint line, for moving the joining head in a direction toward the joint line and resolving the junction deviation, and thus moves the joining head toward the joint line, until the next time the junction deviation becomes zero. If the junction deviation becomes zero, the control device stops outputting the position correction signal to the drive device until the next time the junction deviation exceeds the deviation limit value. Also, a friction stir welding method is executed when the friction stir welding device performs friction stir welding of members to be joined.

Advantageous Effects of Invention

According to the invention, a friction stir welding device and a friction stir welding method that enable accurate movement of a joining tool and high-quality friction stir welding can be provided.

BRIEF DESCRIPTION OF DRAWINGS

FIG. 3A is a view showing the state where two members to be joined are butted against each other. FIG. 3B is a view showing the state where the two members to be joined are superimposed on each other.

DESCRIPTION OF EMBODIMENTS

Figure 1:
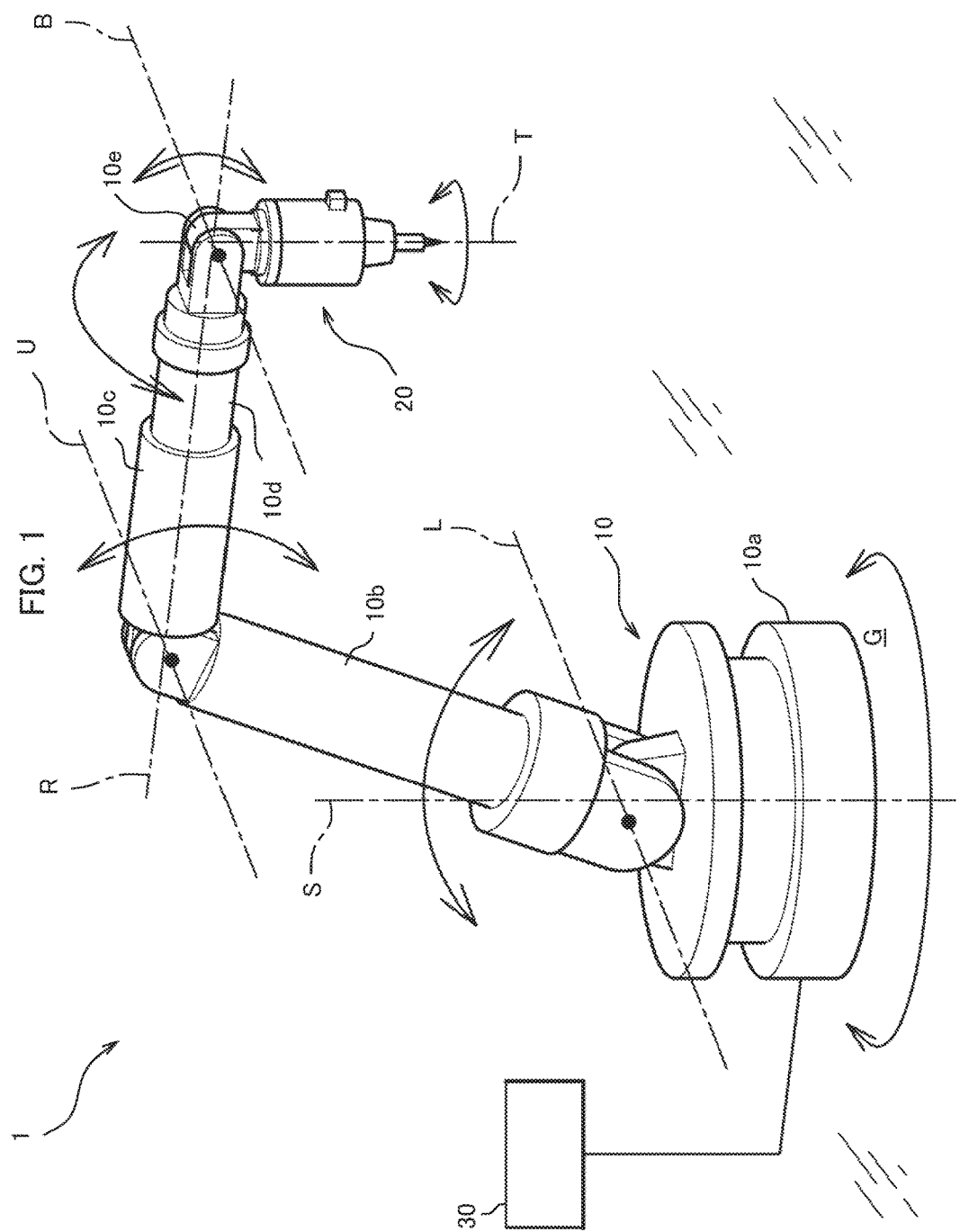
FIG. 1 is a view showing a friction stir welding device.

Hereinafter, friction stir welding devices according to examples of the invention will be described in detail with reference to the drawings as appropriate. In the drawings shown below, the same members are denoted by the same reference signs and duplicate explanation will be omitted as appropriate.

Example 1

Figure 2:
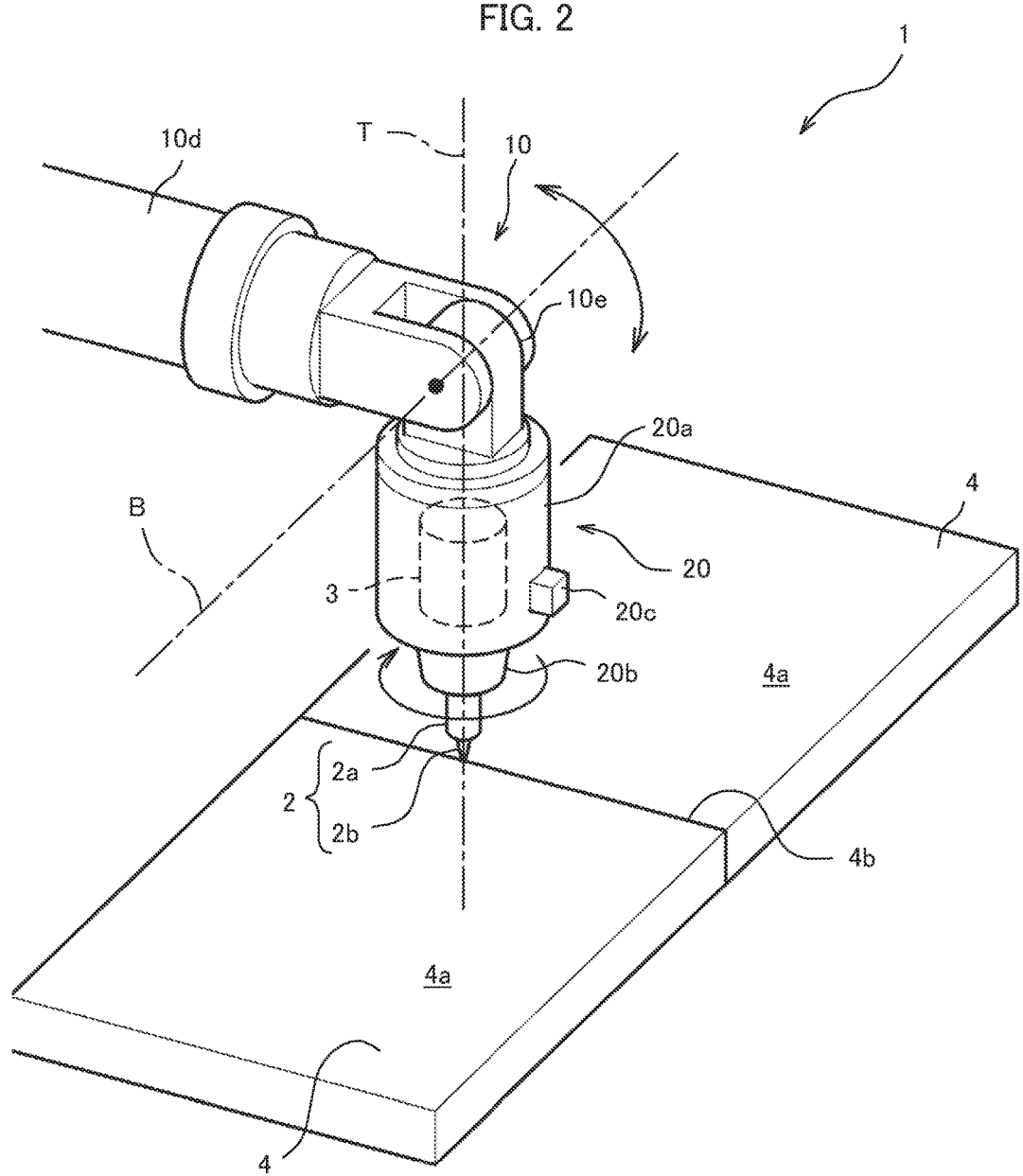
FIG. 2 is a view showing a joining head of the friction stir welding device.

FIG. 1 is a view showing a friction stir welding device. FIG. 2 is a view showing a joining head of the friction stir welding device.

A friction stir welding device 1 in Example 1 is configured by having a joining head 20 attached to a robot main body 10. Then, the robot main body 10 is a drive device which moves the joining head 20.

As shown in FIG. 1, the robot main body 10 has a pedestal part 10a, a lower arm 10b, an upper arm 10c, a wrist 10d, and a wrist head 10e. The joining head 20 is attached to the wrist head 10e.

The lower arm 10b is attached to the pedestal part 10a. The lower arm 10b can swivel about an S-axis with respect to the pedestal part 10a. Also, the lower arm 10b can tilt about an L-axis with respect to the pedestal part 10a. The S-axis is an axis extending in a direction perpendicular to an installation surface G where the pedestal part 10a is installed.

The upper arm 10c is attached in such a way as to be able to swing about a U-axis with respect to the lower arm 10b. The L-axis and the U-axis are axes parallel to each other and both orthogonal to the S-axis.

The wrist 10d is attached to the upper arm 10c in such a way as to be rotatable about an R-axis. The R-axis and the U-axis are axes orthogonal to each other and extending in the direction of extension of the upper arm 10c.

The wrist head 10e is attached to the distal end of the wrist 10d. The wrist head 10e is attached in such a way as to be rotatable about a B-axis. The B-axis is an axis orthogonal to the R-axis and rotates about the R-axis together with the wrist 10d.

Also, the wrist head 10e is rotatable about a T-axis. The T-axis is an axis orthogonal to the B-axis and rotates about the B-axis together with the wrist head 10e.

The lower arm 10b is attached with two degrees of freedom (about the S-axis, about the L-axis) with respect to the pedestal part 10a. The upper arm 10c is attached with one degree of freedom (about the U-axis) with respect to the lower arm 10b. The wrist 10d is attached with one degree of freedom (about the R-axis) with respect to the upper arm 10c. The wrist head 10e is attached with one degree of freedom (about the B-axis) with respect to the wrist 10d. Then, the wrist head 10e rotates about the T-axis with one degree of freedom.

In this way, the robot main body 10 is a six-axis robot having degrees of freedom about the six axes (S-axis, L-axis, U-axis, B-axis, R-axis, and T-axis). Thus, the wrist head 10e, to which the joining head 20 (see FIG. 1) is attached, has six degrees of freedom with respect to the installation surface G.

The robot main body 10 and the joining head 20 are controlled by a control device 30.

It should be noted that the robot main body 10 may be a widely used six-axis industrial robot or its equivalent. Also, the robot main body 10 may be driven by electric power or may be driven by oil pressure or air pressure.

As shown in FIG. 2, a joining tool 2 is attached to the distal end of a main body part 20a, thus forming the joining head 20. An electric motor (main shaft motor 3) is housed inside the main body part 20a, and the joining tool 2 is rotated at the distal end of the main body part 20a by the main shaft motor 3. The axis of rotation of the main shaft motor 3 is provided parallel to the T-axis. Thus, the joining tool 2 rotates about an axis of rotation parallel to the T-axis. For example, a configuration in which a chuck part 20b rotated by the main shaft motor 3 is arranged at the distal end and in which this chuck part 20b holds the joining tool 2 may be employed.

The main shaft motor 3 is controlled by the control device 30 (see FIG. 1) controlling the robot main body 10 shown in FIG. 1.

The joining tool 2 has a shoulder part 2a and a pin part 2b. The shoulder part 2a is cylindrical. The pin part 2b is shaped by reducing the diameter of the shoulder part 2a and is formed coaxially with the shoulder part 2a.

When the pin part 2b is inserted into members to be joined 4 and the shoulder part 2a comes in contact with surfaces 4a of the members to be joined 4, friction stir welding proceeds as the joining tool 2 rotates in this state.

The control device 30 (see FIG. 1) moves the joining tool 2 to a boundary (referred to as a joint line 4b) where the two members to be joined 4 which are to be joined by friction stir welding are butted against each other, and causes the main shaft motor 3 to rotate. The joint line 4b is the boundary where the two members to be joined 4 are joined together. Then, the joining tool 2 is pressed against the members to be joined 4 so that the pin part 2b is inserted into the members to be joined 4. The two members to be joined 4 are fixed to a work table (not illustrated) with a fixing measure, not illustrated, so as not to break away from each other on the joint line 4b at the time of friction stir welding.

Then, the control device 30 causes the joining tool 2 to move along the joint line 4b in the state where the pin part 2b of the rotating joining tool 2 is inserted in the members to be joined 4. At this time, the control device 30 controls the robot main body 10 to move the joining tool 2.

Moreover, the joining head 20 is held by the robot main body 10 with degrees of freedom about six axes. Then, the robot main body 10 is configured to be able to move the joining head 20 in a direction along the joint line 4b. Also, the robot main body 10 is configured to be able to move the joining head 20 in directions toward and away from the members to be joined 4.

Moreover, the friction stir welding device 1 can also perform friction stir welding of superimposed parts of the two members to be joined 4.

For example, the control device 30 (see FIG. 1) controls the robot main body 10 (see FIG. 1), based on the shape of the joint line 4b inputted in advance as numerical data, and causes the joining tool 2, inserted in the members to be joined 4 while rotating, to move along the joint line 4b.

In this way, the friction stir welding device 1 in Example 1 is configured by having the joining head 20 shown in FIG. 2 attached to the wrist head 10e of the robot main body 10 shown in FIG. 1, and is controlled by the control device 30 shown in FIG. 1.

The main body part 20a of the joining head 20 is provided with an image pickup device 20c. The image pickup device 20c is provided so as to pick up an image of the joint line 4b on the members to be joined 4 at the time of friction stir welding. The image pickup device 20c may be, for example, an image pickup device utilizing a CMOS (complementary metal-oxide semiconductor) image sensor or a CCD (charged-coupled device) image sensor.

The image pickup device 20c picks up an image of the joint line 4b when the friction stir welding device 1 performs friction stir welding of the members to be joined 4.

Figure 3A:
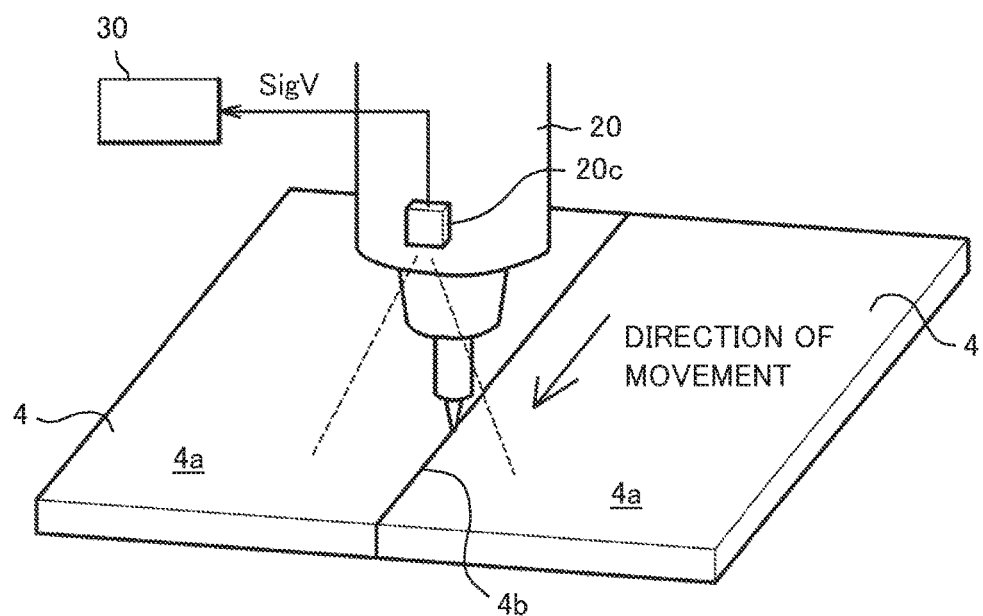
FIGS. 3A and 3B are views showing the state where an image pickup device picks up an image of a joint line.
Figure 3B:
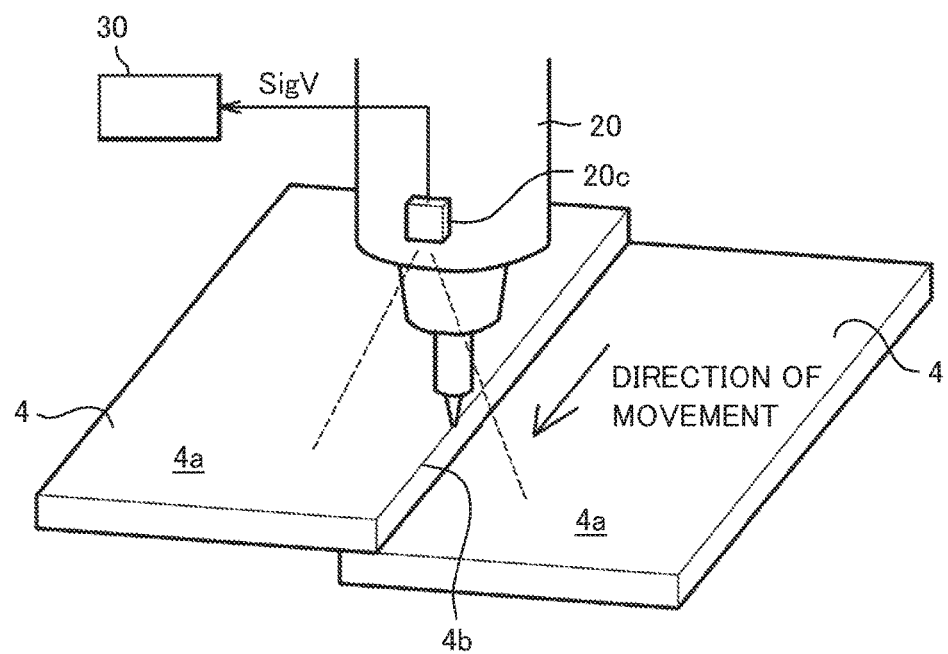

FIGS. 3A and 3B are views showing the state where the image pickup device picks up an image of the joint line. FIG. 3A is a view showing the state where the two members to be joined are butted against each other. FIG. 3B is a view showing the state where the two members to be joined are superimposed on each other.

As shown in FIG. 3A, when the two members to be joined 4 which are to be joined together by friction stir welding come in contact with and butted against each other on one side, the boundary between the two members to be joined 4 is the joint line 4b. The control device 30 controls the robot main body 10 (see FIG. 1) and thus moves the joining head 20 along the joint line 4b. The image pickup device 20c is arranged forward in the direction of movement of the joining head 20 and picks up an image of the joint line 4b that is ahead of the joining head 20 in the direction of movement.

A signal (video signal SigV) of the image of the joint line 4b picked up by the image pickup device 20c is inputted to the control device 30.

Meanwhile, as shown in FIG. 3B, in the case of performing friction stir welding of the members to be joined 4 superimposed on each other, the joint line 4b is formed at the part where the two members to be joined 4 are superimposed. In this case, the image pickup device 20c picks up an image of an edge of the one member to be joined 4 arranged on the side of the image pickup device 20c, as the joint line 4b.

Figure 4:
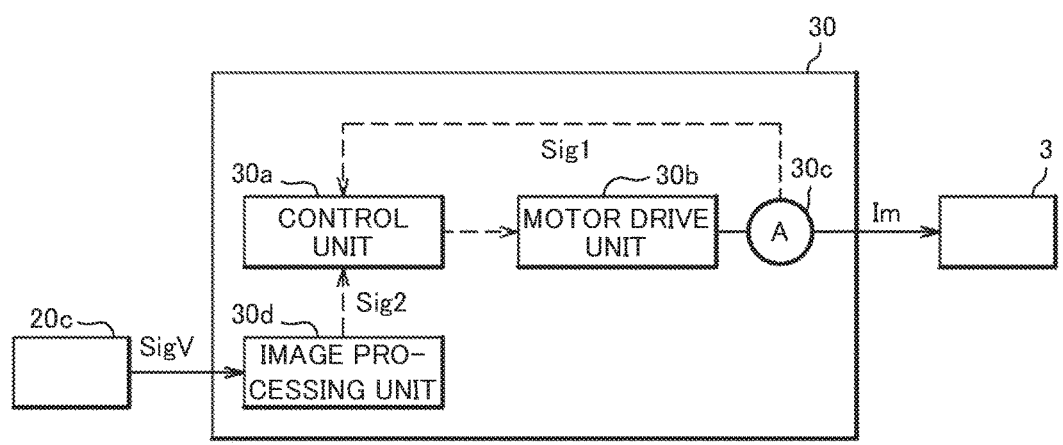
FIG. 4 is a functional block diagram of a control device.
Figure 5:
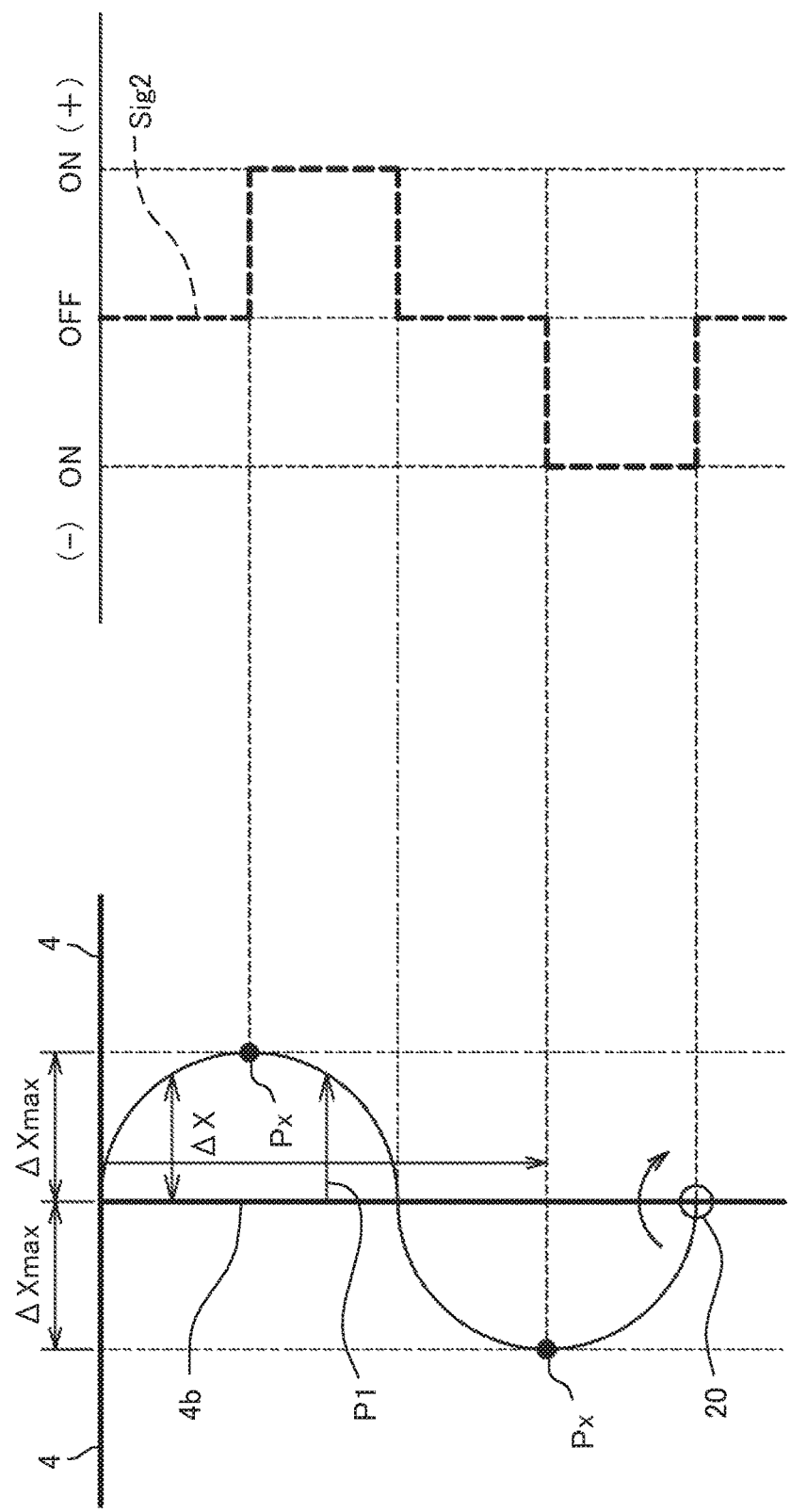
FIG. 5 is a view showing ON/OFF of a position correction signal and the direction of movement of the joining head.

FIG. 4 is a functional block diagram of the control device. FIG. 5 is a view showing ON/OFF of a position correction signal and the direction of movement of the joining head.

As shown in FIG. 4, the control device 30 has a control unit 30a, a motor drive unit 30b, an ammeter 30c, and an image processing unit 30d. The control unit 30a is a computer device configured of a CPU (central processing unit), a memory, and an interface or the like, none of which is illustrated. The CPU executes a predetermined program and thus controls the friction stir welding device 1 (see FIG. 1).

The motor drive unit 30b outputs a current (motor drive current Im) supplied to the main shaft motor 3 of the joining head 20 in response to a command from the control unit 30a. The ammeter 30c inputs, to the control unit 30a, a measurement signal (current detection signal Sig1) obtained by measuring the motor drive current Im supplied to the main shaft motor 3.

The control unit 30a calculates the motor drive current Im supplied to the main shaft motor 3, based on the current detection signal Sig1.

Also, the control unit 30a causes the main shaft motor 3 to rotate at a predetermined rotational speed. For example, the control unit 30a is configured to maintain the rotational speed of the main shaft motor 3 at a predetermined rotation speed by feedback control based on a signal inputted from a rotational speed meter (not illustrated) which measures the rotational speed of the main shaft motor 3.

The video signal SigV of the image picked up by the image pickup device 20c is inputted to the image processing unit 30d. The image processing unit 30d performs image processing on the inputted video signal SigV and extracts the joint line 4b (see FIG. 2). Then, the image processing unit 30d detects misalignment generated between the joint line 4b and the joining head 20 with respect to the direction of movement of the joining head 20 (see FIG. 2).

Between the joint line 4b and the joining head 20, misalignment is generated due to the rotation of the joining tool 2 (see FIG. 2).

The control device 30 controls the robot main body 10 (see FIG. 1) in such a way as to move the joining head 20 in a direction along the joint line 4b as its direction of movement, as shown in FIG. 5. Since the joining tool 2 is rotating (in the example shown in FIG. 5, rotating clockwise) in the joining head 20, a Coriolis force P1 directed in a direction (in the example shown in FIG. 5, to the left, facing the direction of movement) away from the direction of movement (direction along the joint line 4b) is generated in the joining head 20. With the Coriolis force P1, the direction of movement of the joining head 20 changes to the left and the joining head 20 becomes misaligned from the joint line 4b. In this way, due to the Coriolis force P1 generated by the rotation of the joining tool 2, misalignment is generated between the joint line 4b and the joining head 20.

For example, at the time of friction stir welding, the control device 30 (see FIG. 1) decides the direction of movement of the joining head 20 according to the shape of the joint line 4b inputted in advance. At this time, the control device 30 causes the wrist head 10e (see FIG. 1) to rotate about the T-axis so that the image pickup device 20c (see FIG. 2) is situated forward in the direction of movement of the joining head 20. When there is no misalignment of the joint line 4b from the direction of movement of the joining head 20, the joint line 4b extracted by the image processing unit 30d (see FIG. 4) is situated at the center (center of the image) of the image pickup range of the image pickup device 20c.

If the joint line 4b is misaligned from the direction of movement of the joining head 20, the joint line 4b extracted by the image processing unit 30d shown in FIG. 4 is misaligned from the center of the image by the image pickup device 20c. The image processing unit 30d detects the misalignment (junction deviation ΔX) of the joint line 4b from the center of the image, and outputs a position correction signal Sig2 when this junction deviation ΔX exceeds a predetermined level. The position correction signal Sig2 is inputted to the control unit 30a. When the position correction signal Sig2 is inputted, the control unit 30a corrects the direction of movement of the joining head 20 so as to resolve the junction deviation ΔX of the joint line 4b from the direction of movement of the joining head 20.

In Example 1, the junction deviation ΔX is the misalignment (deviation) between the moving joining head 20 and the direction along the joint line 4b.

Also, in Example 1, a deviation detection device which detects the junction deviation ΔX is formed by the image pickup device 20c shown in FIG. 2 and the image processing unit 30d shown in FIG. 4.

Figure 6:
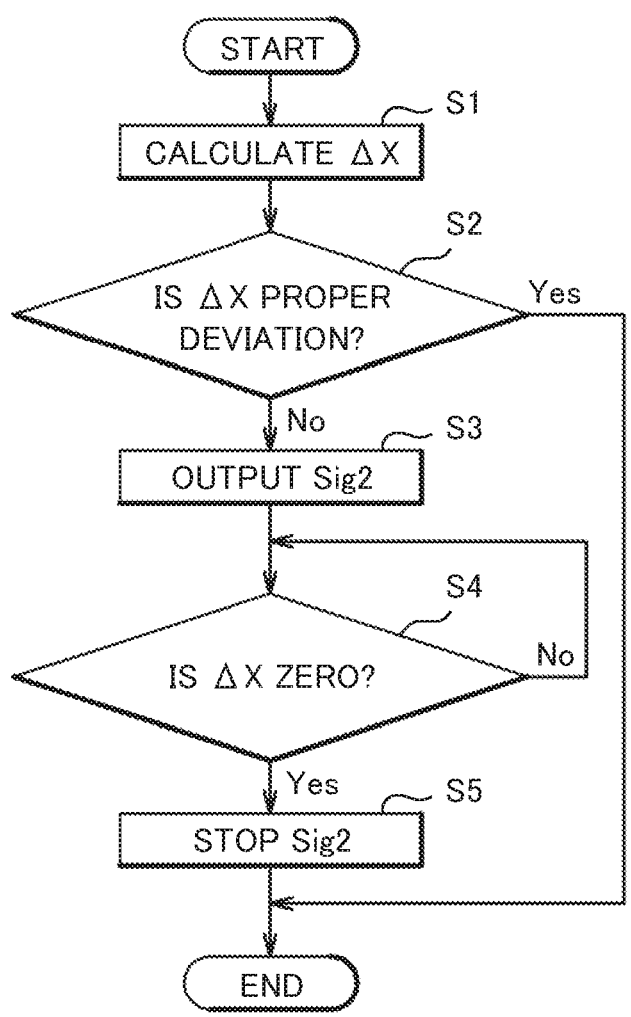
FIG. 6 is a flowchart showing a procedure for an image processing unit to output a position correction signal.

FIG. 6 is a flowchart showing a procedure for the image processing unit to output the position correction signal. The image processing unit 30d of the control device 30 shown in FIG. 4 executes the procedure shown in FIG. 6, as appropriate, and thus outputs the position correction signal Sig2.

The image processing unit 30d of the control device 30 calculates the misalignment of the joining head 20 from the joint line 4b (junction deviation ΔX shown in FIG. 5) (Step S1).

Moreover, the image processing unit 30d determines whether the junction deviation ΔX is within a predetermined proper range (proper deviation) or not (Step S2). When the junction deviation ΔX reaches a predetermined level (deviation limit value ΔXmax), as indicated by a point Px in FIG. 5, the image processing unit 30d determines that the junction deviation ΔX is not a proper deviation (No in Step S2), outputs the position correction signal Sig2 (Step S3), and proceeds to Step S4.

As the image processing unit 30d outputs the position correction signal Sig2, the position correction signal Sig2 turns ON, as indicated by a bold dashed line in FIG. 5. Meanwhile, when the junction deviation ΔX is less than the deviation limit value ΔXmax, the image processing unit 30d determines that the junction deviation ΔX is a proper deviation (Yes in Step S2) and ends this procedure without outputting the position correction signal Sig2.

The image processing unit 30d outputs the position correction signal Sig2 until the junction deviation ΔX becomes zero (No in Step S4). When the junction deviation ΔX becomes zero, the image processing unit 30d stops outputting the position correction signal Sig2 (Step S5) and ends this procedure. As the image processing unit 30d stops outputting the position correction signal Sig2, the position correction signal Sig2 turns OFF, as indicated by a bold dashed line in FIG. 5.

When the position correction signal Sig2 is inputted (when the position correction signal Sig2 is turned ON), the control unit 30a controls the robot main body 10 (see FIG. 1) to move the joining head 20 forward along the direction of the joint line 4b and to move the joining head 20 in the direction such that the junction deviation ΔX is resolved. That is, when the position correction signal Sig2 is inputted, the control device 30 (control unit 30a) causes the joining head 20 to move in the direction toward the joint line 4b.

As shown in FIG. 5, after the point Px, the joining head 20 moves forward toward the joint line 4b and the junction deviation ΔX decreases.

Also, the control unit 30a stops the movement of the joining head 20 in the direction toward the joint line 4b at the time point when the output of the position correction signal Sig2 is stopped (at the time point when the position correction signal Sig2 turns OFF).

Also, the image processing unit 30d may be configured to stop the output of the position correction signal Sig2, for example, slightly before the junction deviation ΔX becomes zero. With this configuration, the joining head 20 avoids exceeding the joint line 4b due to inertia and the position of the joining head 20 can be accurately aligned with the joint line 4b.

Also, as shown in FIG. 5, a position correction signal Sig2 having different polarities (for example, positive (+) and negative (−) signal levels) depending on the difference in the direction of the misalignment of the joining head 20 from the joint line 4b (left-right direction with respect to the direction of movement of the joining head 20) may be employed. With such a position correction signal Sig2, the control unit 30a can acquire the direction of the misalignment (junction deviation ΔX) of the joining head 20 from the joint line 4b, based on the position correction signal Sig2.

As an example, as shown in FIG. 5, a configuration may be employed in which a position correction signal Sig2 with a positive (+) polarity is generated when a junction deviation ΔX of leftward misalignment from the direction of movement of the joining head 20 is generated and in which a position correction signal Sig2 with a negative (−) polarity is generated when a junction deviation ΔX of rightward misalignment from the direction of movement of the joining head 20 is generated. The control unit 30a can determine the direction (left/right) of the junction deviation ΔX from the direction of movement of the joining head 20, based on the polarity (positive/negative) of the position correction signal Sig2.

Also, when controlling the friction stir welding device 1 shown in FIG. 2 to perform friction stir welding of the members to be joined 4, the control device 30 in Example 1 monitors the motor drive current Im, based on the current detection signal Sig1 inputted from the ammeter 30c (see FIG. 4). Moreover, the control device 30 controls the robot main body 10 (see FIG. 1) in such a way that the motor drive current Im reaches a predetermined reference value (proper range of current).

Figure 7:
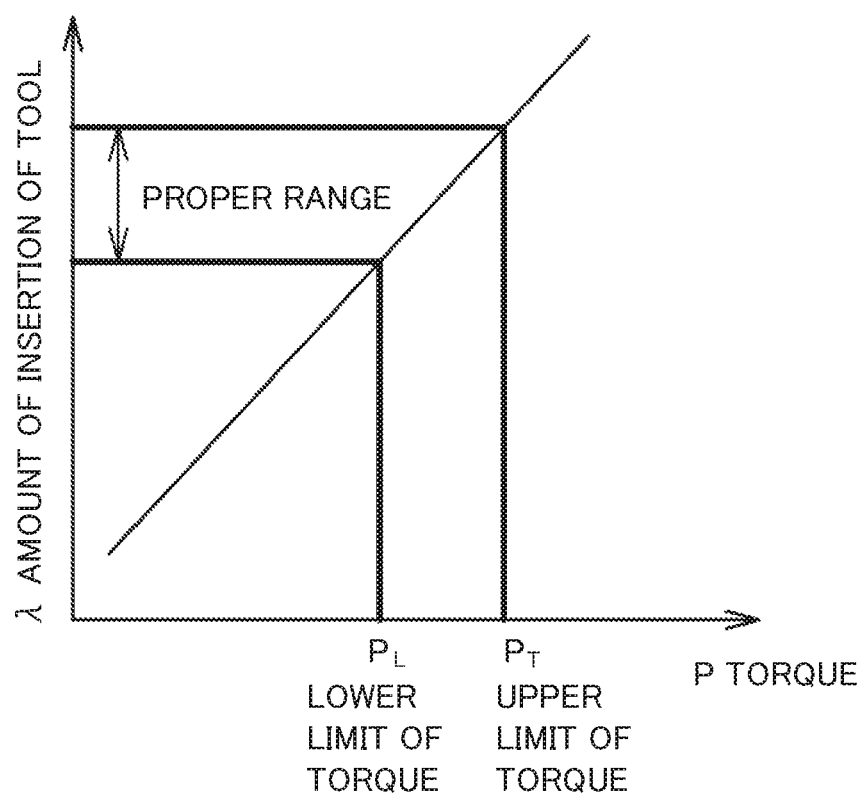
FIG. 7 is a view showing the relationship between the amount of insertion of the tool and torque.

FIG. 7 is a view showing the relationship between the amount of insertion of the tool and torque.

The main shaft motor 3 shown in FIG. 2 rotates the joining tool 2. Also, at the time of friction stir welding, the pin part 2b of the joining tool 2 is inserted into the members to be joined 4 while rotating. Therefore, the pin part 2b receives resistance (torque P) to the rotation from the members to be joined 4. As shown in FIG. 7, as the amount of insertion of the joining tool 2 (pin part 2b) into the members to be joined 4 (amount of insertion of the tool λ)

increases, the resistance (torque P) received by the joining tool 2 from the members to be joined 4 increases.

Also, the resistance (torque P) received by the joining tool 2 from the members to be joined 4 is a load to the rotation of the main shaft motor 3. Therefore, as the torque P received by the joining tool 2 from the members to be joined 4 increases, the load to the rotation of the main shaft motor 3 increases and the motor drive current Im supplied to the main shaft motor 3 increases.

In other words, as the amount of insertion of the tool λ increases, the motor drive current Im increases. Therefore, the control device 30 (see FIG. 4) can monitor the amount of insertion of the tool λ by monitoring the motor drive current Im.

For example, as shown in FIG. 7, if a proper range (proper range of insertion) for the amount of insertion of the tool λ into the members to be joined 4 is set, it is possible to set an upper limit value (upper limit of torque $P_T$) and a lower limit value (lower limit of torque $P_L$) of the torque P corresponding to the proper range of insertion.

Thus, the control device 30 can maintain the amount of insertion of the tool λ within the proper range of insertion by controlling the robot main body 10 (see FIG. 1) in such a way that the motor drive current Im falls between a current corresponding to the upper limit of torque $P_T$ and a current corresponding to the lower limit of torque $P_L$.

If the range between the current corresponding to the upper limit of torque $P_T$ and the current corresponding to the lower limit of torque $P_L$ is set as a proper range of current for the motor drive current Im, the control device 30 can maintain the amount of insertion of the tool λ within the proper range of insertion by maintaining the motor drive current Im within the proper range of current.

If the motor drive current Im is greater than the proper range of current, the control device 30 determines that the amount of insertion of the tool λ is greater than the proper range of insertion, and controls the robot main body 10 to reduce the amount of insertion of the tool λ. The amount of insertion of the pin part 2b into the members to be joined 4 decreases, and the pressing force with which the shoulder part 2a presses the members to be joined 4 drops. Thus, the torque P received by the joining tool 2 from the members to be joined 4 decreases, the load on the main shaft motor 3 is reduced, and the motor drive current Im drops.

Meanwhile, if the motor drive current Im is smaller than the proper range of current, the control device 30 determines that the amount of insertion of the tool λ is smaller than the proper range of insertion, and controls the robot main body 10 to increase the amount of insertion of the tool λ. The amount of insertion of the pin part 2b into the members to be joined 4 increases, and the pressing force with which the shoulder part 2a presses the members to be joined 4 increases. Thus, the torque P received by the joining tool 2 from the members to be joined 4 increases, the load on the main shaft motor 3 increases, and the motor drive current Im increases.

Also, when reducing the amount of insertion of the tool λ or when increasing the amount of insertion of the tool λ, the control device 30 controls the robot main body 10 in such a way that the joining tool 2 moves in a direction perpendicular to the members to be joined 4, by a combination of movements of the lower arm 10b, the upper arm 10c, the wrist 10d, and the wrist head 10e.

In this way, at the time of friction stir welding, the control device 30 (see FIG. 4) in Example 1 monitors the motor drive current Im, based on the current detection signal Sig1 inputted from the ammeter 30c (see FIG. 4). Then, the control device 30 controls the robot main body 10 in such a way that the motor drive current Im falls within the proper range of current. That is, the control device 30 maintains the amount of insertion of the tool λ within the proper range of insertion, based on the motor drive current Im. Thus, the amount of insertion of the tool λ is maintained within the proper range of insertion, based on the motor drive current Im, and the quality of friction stir welding is improved.

Also, the relationship between the torque P received by the joining tool 2 from the members to be joined 4 (load on the main shaft motor 3) and the motor drive current Im is decided, based on characteristics of the main shaft motor 3, and the proper range of current corresponding to the upper limit of torque $P_T$ and the lower limit of torque $P_L$ is decided, based on the characteristics.

Moreover, the proper range of insertion for the amount of insertion of the tool λ, and the upper limit of torque $P_T$ and the lower limit of torque $P_L$ corresponding to the proper range of insertion are suitably set, based on the material or the like of the members to be joined 4.

As described above, in the friction stir welding device 1 in Example 1 shown in FIGS. 1 and 2, when the joining head 20 is misaligned from the direction of movement along the joint line 4b on the members to be joined 4 (when the junction deviation ΔX shown in FIG. 5 is generated), the joining head 20 moves in such a way as to resolve the misalignment. Therefore, the joining head 20 moves forward accurately along the joint line 4b. Thus, the position accuracy at the time of performing friction stir welding of the members to be joined 4 is improved and the quality of friction stir welding is improved.

Also, the control device 30 can maintain the amount of insertion of the tool λ within the proper range of insertion by maintaining the motor drive current Im supplied to the main shaft motor 3 within the proper range of current. Thus, at the time of performing friction stir welding, the joining tool 2 (pin part 2b) is inserted properly into the members to be joined 4. Therefore, the quality of friction stir welding is improved.

Example 2

Figure 8:
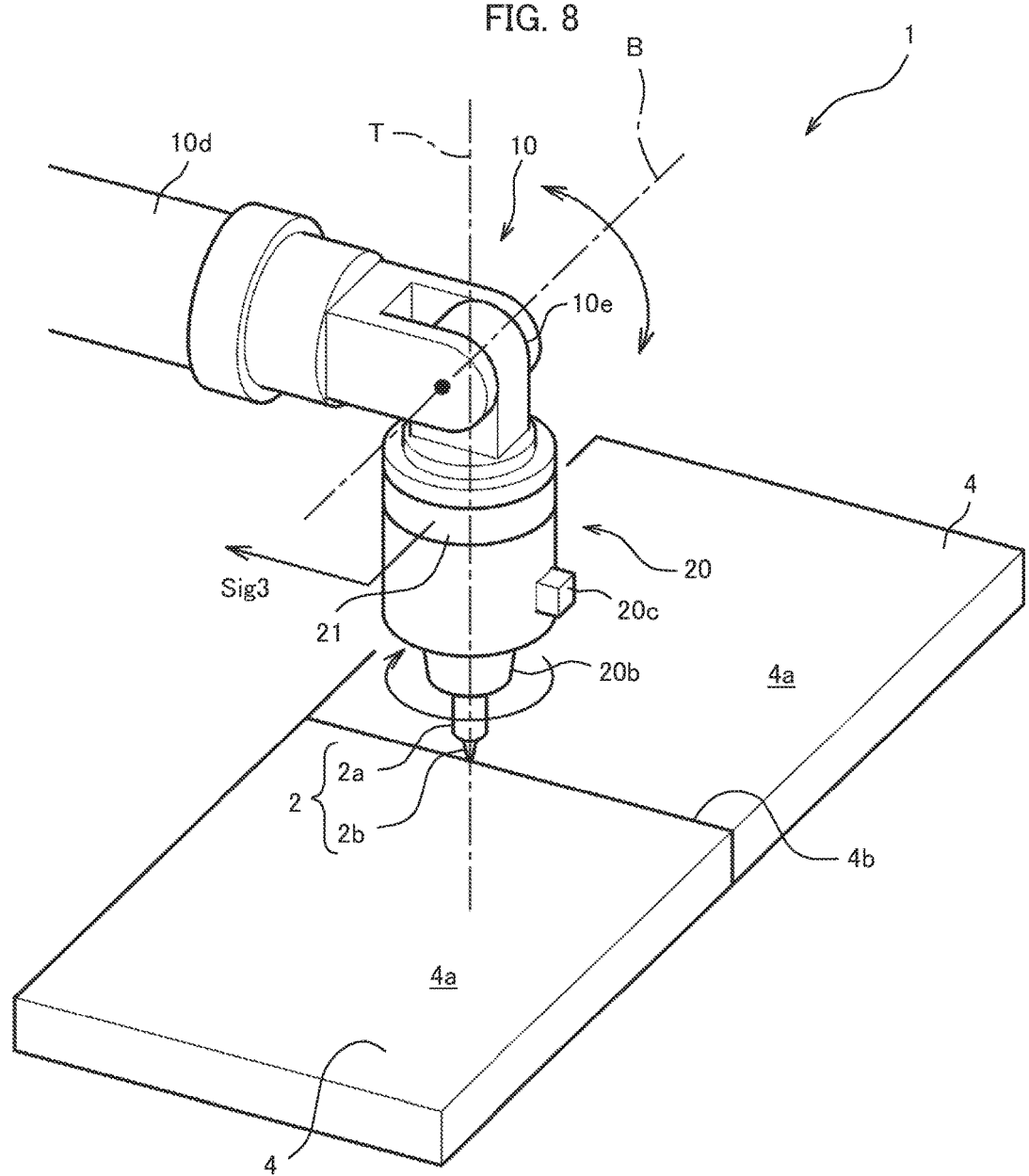
FIG. 8 is a view showing a joining head according to Example 2.
Figure 9:
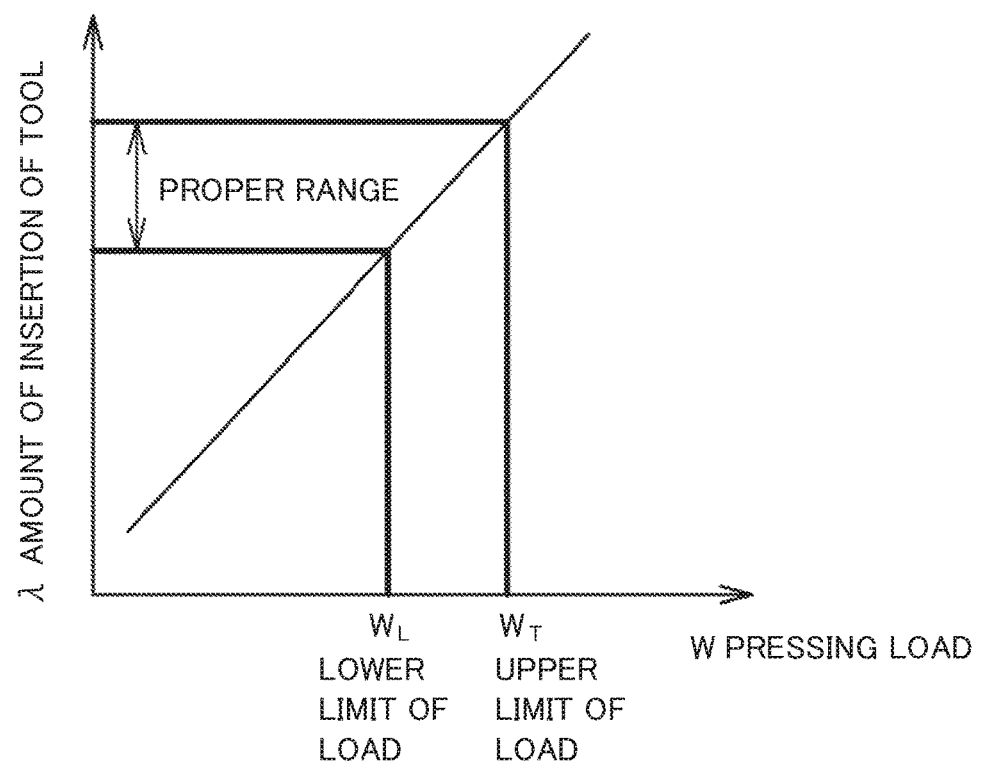
FIG. 9 is a view showing the relationship between a proper range of insertion for the amount of insertion of the tool and press load.

FIG. 8 is a view showing a joining head according to Example 2. FIG. 9 is a view showing the relationship between a proper range of insertion for the amount of insertion of the tool and pressing load.

As shown in FIG. 8, the joining head 20 in Example 2 is attached to the wrist head 10e via a load sensor (load cell 21).

Moreover, the friction stir welding device 1 in Example 2 has the same configuration as the friction stir welding device 1 in Example 1 shown in FIGS. 1 and 2, except for having the load cell 21. Also, the control device 30 (see FIG. 4) resolves the misalignment (junction deviation ΔX shown in FIG. 5) of the joining head 20 from the joint line 4b, as in Example 1.

The load cell 21 detects the load when the joining head 20 is pressed against the wrist head 10e, and outputs a detection signal (load signal Sig3). The load signal Sig3 is inputted to the control unit 30a (see FIG. 4) of the control device 30.

The control unit 30a (see FIG. 4) of the control device 30 calculates the load (pressing load W) with which the joining head 20 presses the wrist head 10e, based on the load signal Sig3. As the pressing load W increases, the amount of insertion of the tool λ increases. Therefore, the control device 30 can adjust the amount of insertion of the tool λ by adjusting the pressing load W. The relationship between the pressing load W and the amount of insertion of the tool λ is decided as a characteristic due to the material of the members to be joined 4.

For example, as shown in FIG. 9, if a proper range (proper range of insertion) for the amount of insertion of the tool λ into the members to be joined 4 is set, it is possible to set an upper limit value (upper limit of load $W_T$) and a lower limit value (lower limit of load $W_L$) of the pressing load W corresponding to the proper range of insertion.

Thus, the control device 30 (see FIG. 4) can maintain the amount of insertion of the tool λ within the proper range of insertion by controlling the robot main body 10 (see FIG. 1) in such a way that the pressing load W falls between the upper limit of load $W_T$ and the lower limit of load $W_L$.

If the range between the upper limit of load $W_T$ and the lower limit of load $W_L$ is set as a proper range of load for the pressing load W, the control device 30 can maintain the amount of insertion of the tool λ within the proper range of insertion by maintaining the pressing load W within the proper range of load.

If the pressing load W is smaller than the proper range of load, the control device 30 controls the robot main body 10 to increase the amount of insertion of the tool λ. The pressing force with which the shoulder part 2a presses the members to be joined 4 increases. Thus, the load received by the joining tool 2 from the members to be joined 4 increases and the pressing load W increases.

Meanwhile, if the pressing load W is greater than the proper range of load, the control device 30 controls the robot main body 10 to reduce the amount of insertion of the tool λ. The pressing force with which the shoulder part 2a presses the members to be joined 4 decreases. Thus, the load received by the joining tool 2 from the members to be joined 4 decreases and the pressing load W decreases.

In this way, at the time of friction stir welding, the control device 30 (see FIG. 4) in Example 2 monitors the pressing load W, based on the load signal Sig3 inputted from the load cell 21 (see FIG. 8). Then, the control device 30 controls the robot main body 10 in such a way that the pressing load W falls within the proper range of load. Thus, the amount of insertion of the tool λ is maintained within the proper range of insertion and the quality of friction stir welding is improved.

Example 3

Figure 10:
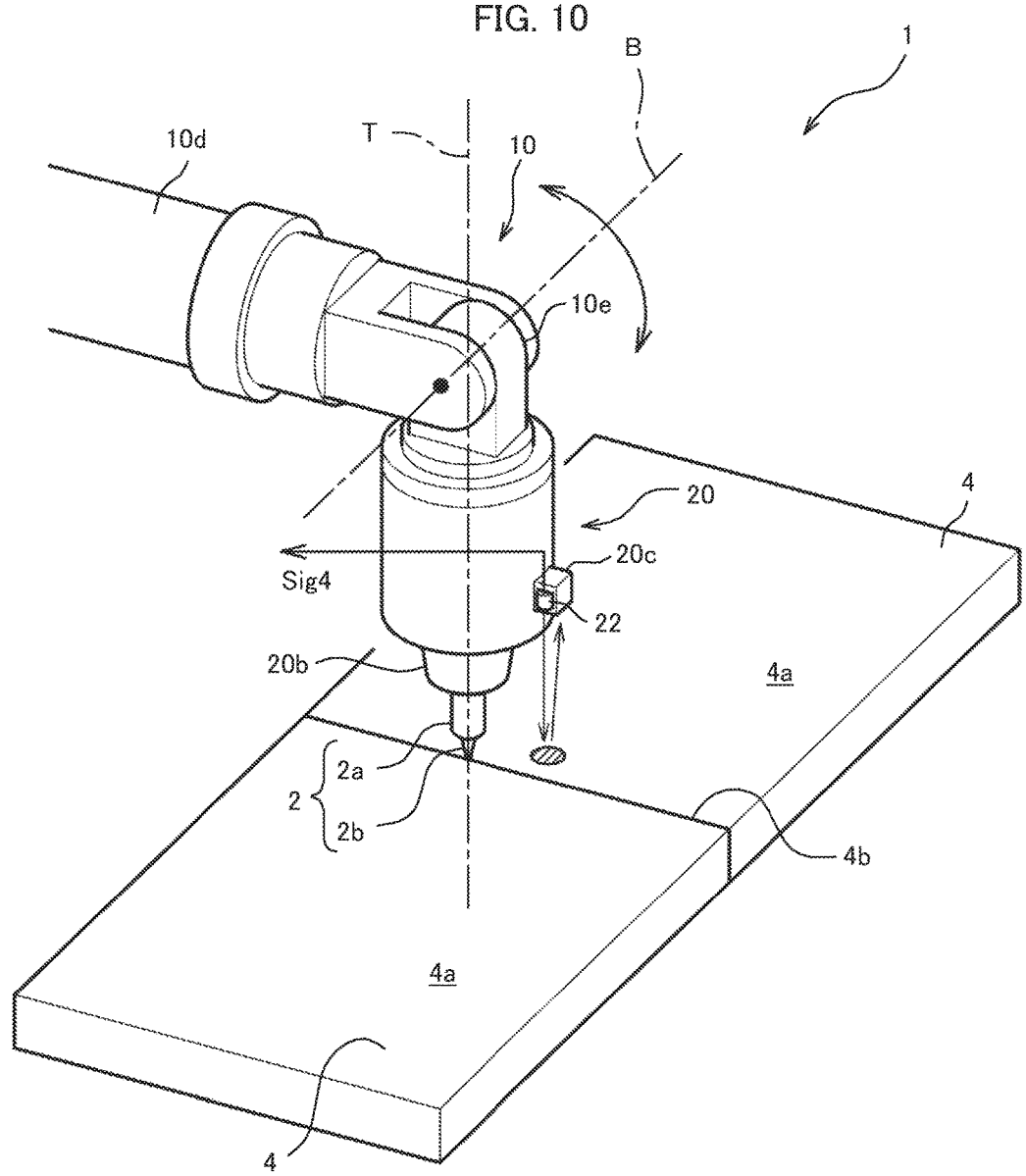
FIG. 10 is a view showing a joining head according to Example 3.
Figure 11:
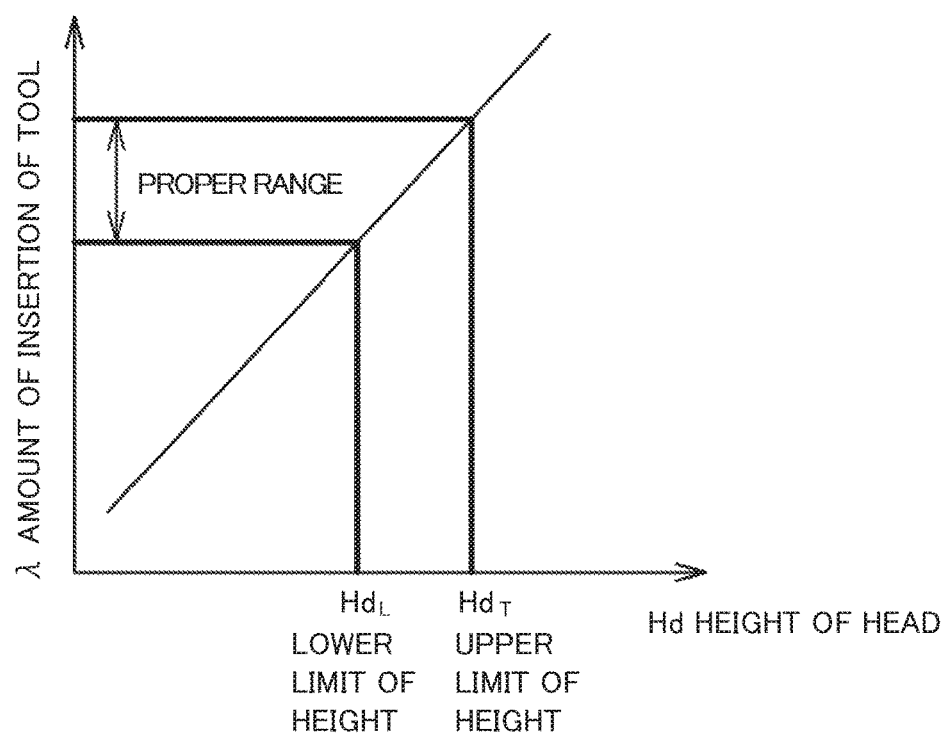
FIG. 11 is a view showing the relationship between a proper range of insertion for the amount of insertion of the tool and the height of the head.

FIG. 10 is a view showing a joining head according to Example 3. FIG. 11 is a view showing the relationship between a proper range of insertion for the amount of insertion of the tool and the height of the head.

As shown in FIG. 10, the joining head 20 in Example 3 is provided with a distance meter 22 (distance measuring device).

Moreover, the friction stir welding device 1 in Example 3 has the same configuration as that of the friction stir welding device 1 in Example 1 shown in FIGS. 1 and 2, except for having the distance meter 22. Also, the control device 30 (see FIG. 4) resolves the misalignment (junction deviation ΔX shown in FIG. 5) of the joining head 20 from the joint line 4b, as in Example 1.

The distance meter 22 measures the distance from the joining head 20 to the surfaces 4a of the members to be joined 4, converts the measured distance into a measurement signal (distance signal Sig4), and outputs the measurement signal. The distance signal Sig4 is inputted to the control unit 30a (see FIG. 4) of the control device 30. The structure of the distance meter 22 (distance measuring device) is not limited. For example, a contactless distance meter 22 which casts a laser beam onto the members to be joined 4 and measures the distance to the surfaces 4a, based on its reflected light, may be used. Alternatively, a contact distance meter 22 which has a rod (not illustrated) directed toward the members to be joined 4 and measures the distance to the surfaces 4a, based on the amount of displacement of the rod, may be used.

The control unit 30a (see FIG. 4) of the control device 30 calculates the height of the joining head 20 (height of the head Hd) from the surfaces 4a of the members to be joined 4, based on the distance signal Sig4. As the height of the head Hd decreases, the amount of insertion of the tool λ increases. The relationship between the height of the head Hd and the amount of insertion of the tool λ is decided as a characteristic due to the material of the members to be joined 4. Therefore, the control device 30 can adjust the amount of insertion of the tool λ by adjusting the height of the head Hd.

For example, as shown in FIG. 11, if a proper range (proper range of insertion) for the amount of insertion of the tool λ into the members to be joined 4 is set, it is possible to set an upper limit value (upper limit of height $Hd_T$) and a lower limit value (lower limit of height $Hd_L$) of the height of the head Hd corresponding to the proper range of insertion.

Thus, the control device 30 (see FIG. 4) can maintain the amount of insertion of the tool λ within the proper range of insertion by controlling the robot main body 10 (see FIG. 1) in such a way that the height of the head Hd falls between the upper limit of height $Hd_T$ and the lower limit of height $Hd_L$.

If the range between the upper limit of height $Hd_T$ and the lower limit of height $Hd_L$ is set as a proper range of height for the height of the head Hd, the control device 30 can maintain the amount of insertion of the tool λ within the proper range of insertion by maintaining the height of the head Hd within the proper range of height.

If the height of the head Hd is higher than the proper range of height, the control device 30 controls the robot main body 10 to bring the joining head 20 closer to the members to be joined 4 and increase the amount of insertion of the tool λ. The distance between the joining tool 2 and the members to be joined 4 decreases and the height of the head Hd decreases. Meanwhile, if the height of the head Hd is lower than the proper range of height, the control device 30 controls the robot main body 10 to move the joining head 20 away from the members to be joined 4 and reduce the amount of insertion of the tool λ. The distance between the joining tool 2 and the members to be joined 4 increases and the height of the head Hd increases.

In this way, at the time of friction stir welding, the control device 30 (see FIG. 4) in Example 3 monitors the height of the head Hd, based on the distance signal Sig4 inputted from the distance meter 22 (see FIG. 10). Then, the control device 30 controls the robot main body 10 in such a way that the height of the head Hd falls within the proper range of height. That is, the control device 30 in Example 3 maintains the amount of insertion of the tool λ within the proper range of insertion, based on the distance signal Sig4 outputted from the distance meter 22 (distance measuring device). Thus, the amount of insertion of the tool λ is maintained within the proper range of insertion and the quality of friction stir welding is improved.

Example 4

Figure 12:
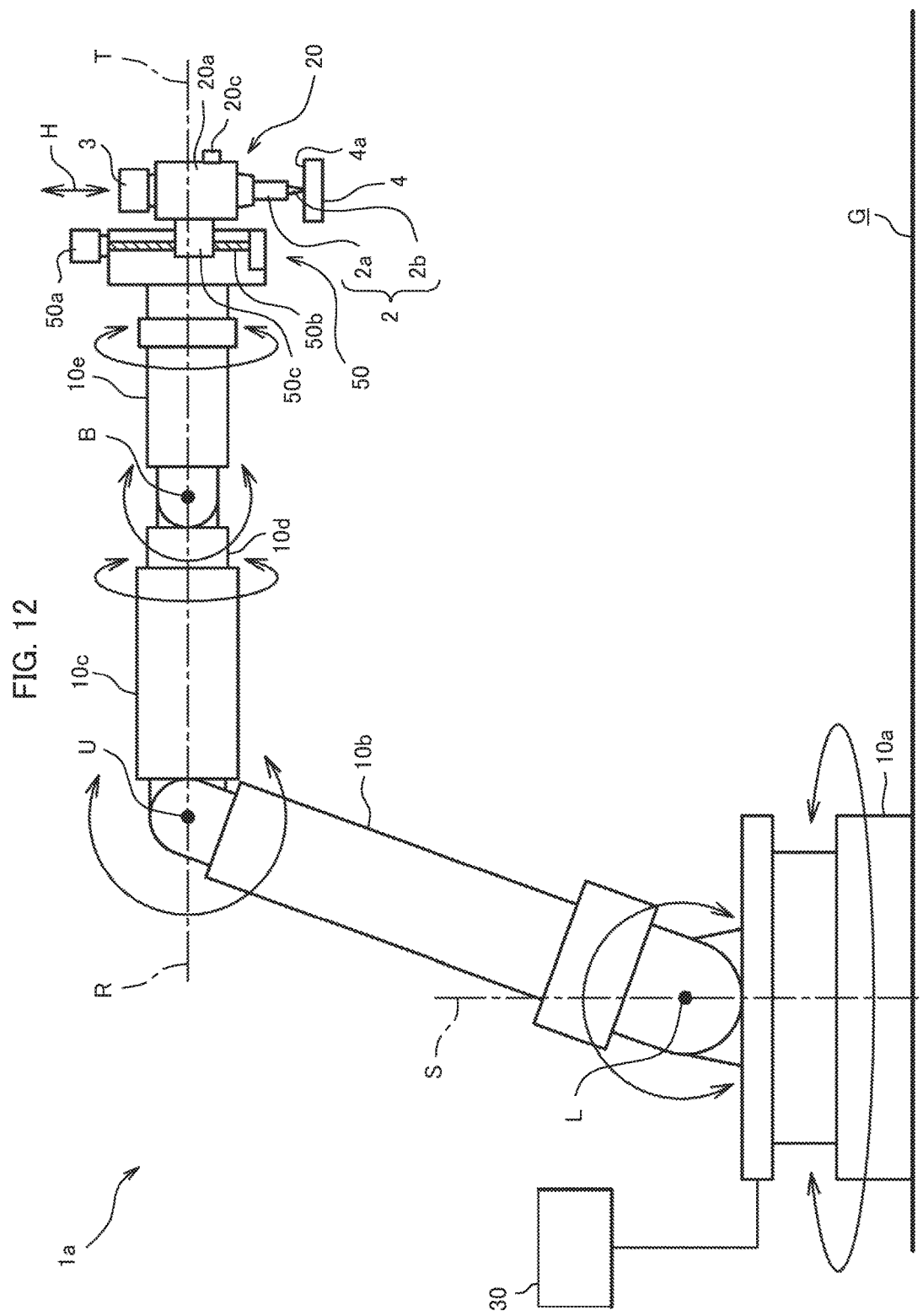
FIG. 12 is a view showing a friction stir welding device according to Example 4.

FIG. 12 is a view showing a friction stir welding device according to Example 4.

As shown in FIG. 4, in a friction stir welding device 1a according to Example 4, the joining head 20 is attached to the robot main body 10 via a lift device 50.

The structure of the lift device 50 is not limited. For example, the lift device 50 may be configured of a servo motor 50a, a ball screw 50b, and a lift head 50c.

The ball screw 50b is provided, extending in a direction (direction of an H-axis) of moving the joining head 20 in a straight line, and is rotated about an axis by the servo motor 50a. The lift head 50c is attached to the ball screw 50b by a ball screw mechanism, and moves in its axial direction according to the rotation of the ball screw 50b. Then, the joining head 20 is attached to the lift head 50c.

Also, in Example 4, the direction of the axis of rotation of the joining tool 2, that is, of the axis of rotation of the main shaft motor 3, is defined as the direction of the H-axis.

Moreover, though not illustrated, a lift device in which the lift head 50c is moved in a straight line in the direction of the H-axis by an actuator which is driven by oil pressure or air pressure may be used.

The friction stir welding device 1a in Example 4 has the same configuration as that of the friction stir welding device 1 in Example 1 shown in FIGS. 1 and 2, except for having the lift device 50. Also, the control device 30 (see FIG. 4) resolves the misalignment (junction deviation $\Delta X$ shown in FIG. 5) of the joining head 20 from the joint line 4b, as in Example 1.

Moreover, while, in FIG. 12, the main shaft motor 3 is arranged outside of the main body part 20a, the main shaft motor 3 may be housed within the main body part 20a, as in Example 1.

In the friction stir welding device 1a in Example 4, the one-axis degree of freedom (movement in the H-axis direction) provided for the lift device 50 is added to the six-axis degrees of freedom provided for the robot main body 10. Therefore, the joining head 20 has seven-axis degrees of freedom with respect to the installation surface G. In this way, in the friction stir welding device 1a in Example 4, the joining head 20 is held on the robot main body 10 with the seven-axis degrees of freedom. Then, the lift device 50 is configured to be able to move the joining head 20 in directions toward and away from the members to be joined 4.

In the friction stir welding device 1a in Example 4, the control device 30 controls the robot main body 10, based on a video signal SigV inputted from the image pickup device 20c, and causes the joining head 20 to move along the joint line 4b (see FIG. 2).

Also, the control device 30 performs friction stir welding of the members to be joined 4 while changing the amount of insertion of the tool $\lambda$ in such a way that the motor drive current Im supplied to the main shaft motor 3 falls within a proper range of current.

At this time, the control device 30 according to Example 4 drives the lift device 50 and thus changes the amount of insertion of the tool $\lambda$. If the motor drive current Im is greater than the proper range of current, the control device 30 drives the servo motor 50a, thus causes the joining head 20 to move away from the members to be joined 4, and reduces the amount of insertion of the tool $\lambda$. The torque P received by the joining tool 2 from the members to be joined 4 decreases, the load on the main shaft motor 3 is reduced, and the motor drive current Im drops. Meanwhile, if the motor drive current Im is smaller than the proper range of current, the control device 30 drives the servo motor 50a, thus causes the joining head 20 to move toward the members to be joined 4, and increases the amount of insertion of the tool $\lambda$. The torque P received by the joining tool 2 from the members to be joined 4 increases, the load on the main shaft motor 3 increases, and the motor drive current Im increases.

In this way, the control device 30 according to Example 4 performs friction stir welding of the members to be joined 4 while controlling the lift device 50 to maintain the motor drive current Im within the proper range of current.

When the motor drive current Im departs from the proper range of current, the friction stir welding device 1a in Example 4 can return the motor drive current Im to the proper range of current simply by driving the lift device 50. Therefore, the motor drive current Im can be adjusted with less energy (electric power) than for driving the robot main body 10.

Also, in the case where the joining head 20 is moved by the lift device 50, inertia can be made smaller than in the case where the joining head 20 is moved by the robot main body 10. Therefore, the accuracy of position control of the joining head 20 is improved.

Example 5

Figure 13:
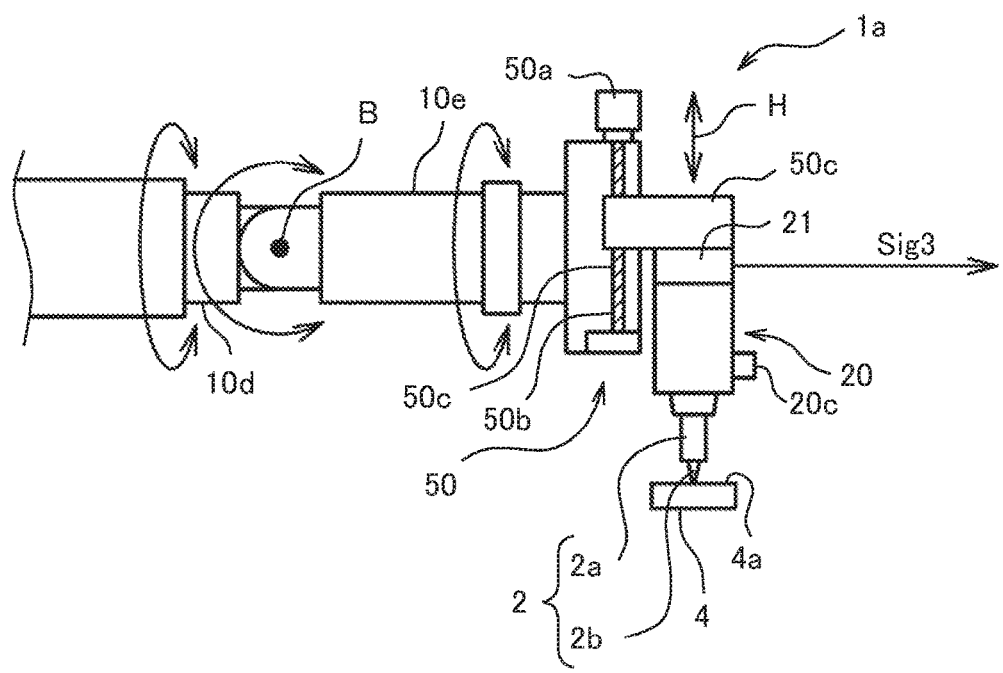
FIG. 13 is a view showing a joining head of a friction stir welding device according to Example 5.

FIG. 13 is a view showing a joining head of a friction stir welding device according to Example 5.

As shown in FIG. 13, the joining head 20 of the friction stir welding device 1a in Example 5 is attached to the lift head 50c via a load sensor (load cell 21).

Moreover, the friction stir welding device 1a in Example 5 has the same configuration as that of the friction stir welding device 1a in Example 4 shown in FIG. 12, except for having the load cell 21. Also, the control device 30 (see FIG. 4) resolves the misalignment (junction deviation $\Delta X$ shown in FIG. 5) of the joining head 20 from the joint line 4b, as in Example 1.

The load cell 21 detects the load when the joining head 20 is pressed against the lift head 50c, and outputs a load signal Sig3. The load signal Sig3 is inputted to the control unit 30a (see FIG. 4) of the control device 30.

Then, as in Example 2, the control device 30 (see FIG. 4) calculates the pressing load W based on the load signal Sig3. Moreover, the control device 30 controls the lift device 50 in such a way that the calculated pressing load W falls between the upper limit of load $W_T$ and the lower limit of load $W_L$ shown in FIG. 9.

In this way, if the pressing load W is smaller than the proper range of load, the control device 30 (see FIG. 4) of the friction stir welding device 1a according to Example 5 controls the lift device 50 to increase the amount of insertion of the tool $\lambda$. The load received by the joining tool 2 from the members to be joined 4 increases and the pressing load W increases. Meanwhile, if the pressing load W is greater than the proper range of load, the control device 30 controls the lift device 50 to reduce the amount of insertion of the tool $\lambda$. The load received by the joining tool 2 from the members to be joined 4 decreases and the pressing load W decreases. Thus, the amount of insertion of the tool $\lambda$ is maintained within the proper range of insertion and the quality of friction stir welding is improved.

Also, as in Example 4, the amount of insertion of the tool $\lambda$ can be adjusted with less energy. Moreover, since the inertia with respect to the movement of the joining head 20 can be reduced, the accuracy of position control of the joining head 20 is improved.

Example 6

Figure 14:
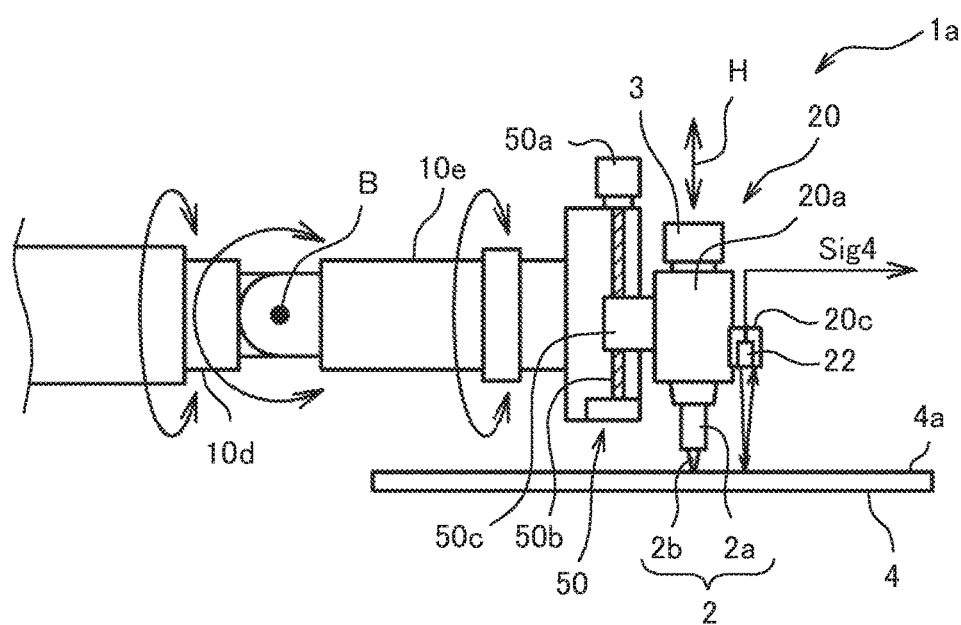
FIG. 14 is a view showing a joining head of a friction stir welding device according to Example 6.

FIG. 14 is a view showing a joining head of a friction stir welding device according to Example 6.

As shown in FIG. 14, the joining head 20 of the friction stir welding device 1a in Example 6 is provided with a distance meter 22.

Moreover, the friction stir welding device 1a in Example 6 has the same configuration as that of the friction stir welding device 1a in Example 4 shown in FIG. 12, except for having the distance meter 22. Also, the control device 30 (see FIG. 4) resolves the misalignment (junction deviation ΔX shown in FIG. 5) of the joining head 20 from the joint line 4b, as in Example 1.

The distance meter 22 measures the distance (height of the head Hd) from the joining head 20 to the surfaces 4a of the members to be joined 4 and outputs a distance signal Sig4. The control device 30 (see FIG. 4) calculates the height of the head Hd, based on the distance signal Sig4. Moreover, the control device 30 controls the lift device 50 in such a way that the calculated height of the head Hd falls between the upper limit of height $Hd_T$ and the lower limit of height $Hd_L$ (proper range of height) shown in FIG. 11.

If the height of the head Hd is lower than the proper range of height, the control device 30 (see FIG. 4) controls the lift device 50 to reduce the amount of insertion of the tool λ. The joining head 20 and the members to be joined 4 are moved away from each other and the height of the head Hd increases. Meanwhile, if the height of the head Hd is higher than the proper range of height, the control device 30 controls the lift device 50 to increase the amount of insertion of the tool λ. The joining head 20 and the members to be joined 4 are moved closer to each other and the height of the head Hd decreases.

In this way, the control device 30 (see FIG. 4) of the friction stir welding device 1a in Example 6 performs friction stir welding of the members to be joined 4 while controlling the lift device 50 to maintain the height of the head Hd within the proper range of height. Thus, the amount of insertion of the tool λ is maintained within the proper range of insertion and the quality of friction stir welding is improved.

Also, as in Example 4, the amount of insertion of the tool λ can be adjusted with less energy. Moreover, since the inertia with respect to the movement of the joining head 20 can be reduced, the accuracy of position control of the joining head 20 is improved.

Example 7

Figure 15:
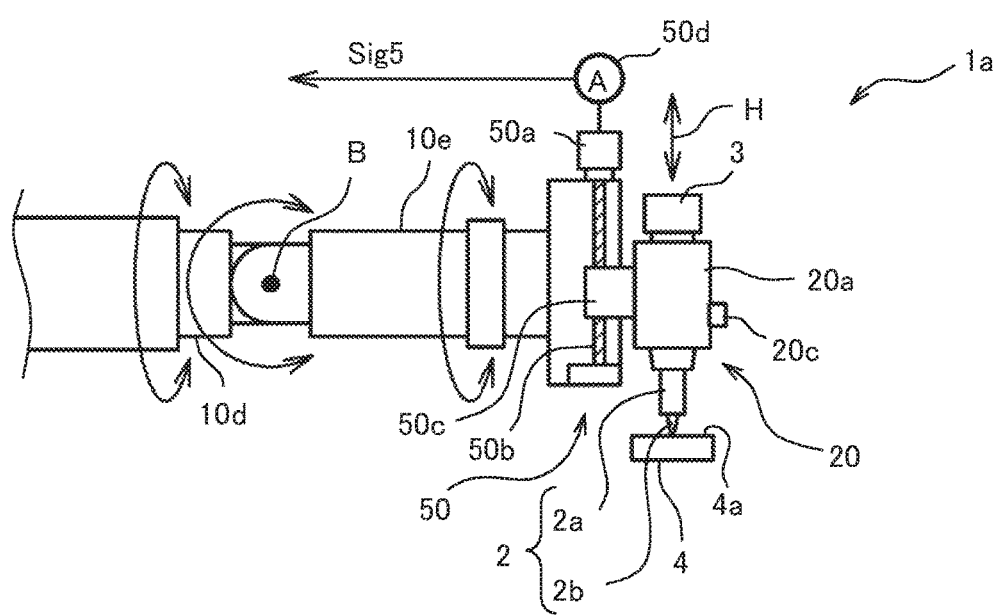
FIG. 15 is a view showing a joining head of a friction stir welding device according to Example 7.

FIG. 15 is a view showing a joining head in a friction stir welding device according to Example 7.

As shown in FIG. 15, the friction stir welding device 1a in Example 7 is provided with an ammeter (lift device ammeter 50d) which measures the current (position control current Is) supplied to the servo motor 50a of the lift device 50. The lift device ammeter 50d measures the position control current Is supplied to the servo motor 50a and outputs a measurement signal (lift current signal Sig5). The lift current signal Sig5 is inputted to the control device 30 (see FIG. 12). The control unit 30a (see FIG. 4) of the control device 30 calculates the position control current Is supplied to the servo motor 50a, based on the lift current signal Sig5.

Moreover, the friction stir welding device 1a in Example 7 has the same configuration as that of the friction stir welding device 1a in Example 4 shown in FIG. 12, except for having the lift device ammeter 50d. Also, the control device 30 (see FIG. 4) resolves the misalignment (junction deviation ΔX shown in FIG. 5) of the joining head 20 from the joint line 4b, as in Example 1.

After driving the servo motor 50a and deciding the position of the lift head 50c (joining head 20), the control device 30 (see FIG. 4) supplies the position control current Is to the servo motor 50a in order to maintain the lift head 50c at that position. Thus, the position of the lift head 50c is maintained and hence the position of the joining tool 2 of the joining head 20 attached to the lift head 50c is maintained. Then, at the time of performing friction stir welding of the members to be joined 4, the distance between the joining head 20 and the members to be joined 4 (height of the head Hd) is maintained and the amount of insertion of the tool λ is maintained.

At the time of friction stir welding, if the height of the head Hd changes, the load applied to the servo motor 50a changes and therefore the position control current Is changes. In other words, if the position control current Is is constant, the height of the head Hd is constant. Also, the relationship between the position control current Is and the height of the head Hd is decided as a characteristic of the friction stir welding device 1a (see FIG. 12).

For example, as shown in FIG. 11, if a proper range of insertion for the amount of insertion of the tool λ into the members to be joined 4 is set, it is possible to set an upper limit value (upper limit of height $Hd_T$) and a lower limit value (lower limit of height $Hd_L$) of the height of the head Hd corresponding to the proper range of insertion.

If the position control current Is calculated based on the lift current signal Sig5 becomes greater than the current at the time when the height of the head Hd is equal to the upper limit of height $Hd_T$, the control device 30 (see FIG. 4) controls the lift device 50 to move the joining head 20 away from the members to be joined 4 and thus increase the height of the head Hd. Meanwhile, if the position control current Is calculated based on the lift current signal Sig5 becomes smaller than the current at the time when the height of the head Hd is equal to the lower limit of height $Hd_L$, the control device 30 controls the lift device 50 to move the joining head 20 closer to the members to be joined 4 and thus reduce the height of the head Hd.

In this way, the control device 30 of the friction stir welding device 1a according to Example 7 can maintain the amount of insertion of the tool λ within the proper range of insertion by adjusting the height of the head Hd, based on the position control current Is. Thus, the amount of insertion of the tool λ is maintained within the proper range of insertion and the quality of friction stir welding is improved.

Also, as in Example 4, the amount of insertion of the tool λ can be adjusted with less energy. Moreover, since the inertia with respect to the movement of the joining head 20 can be reduced, the accuracy of position control of the joining head 20 is improved.

As described above, the friction stir welding device 1 in Example 1 shown in FIGS. 1 and 2 is configured to be able to correct misalignment (junction deviation ΔX shown in FIG. 5) between the joining head 20 and the joint line 4b if such misalignment is generated, when moving the joining head 20 along the joint line 4b formed as the boundary between the two members to be joined 4 which are to be jointed together. That is, the friction stir welding device 1 in Example 1 can bring the junction deviation ΔX generated between the joining head 20 and the joint line 4b, close to zero.

The control device 30 controlling the friction stir welding device 1 performs image processing on the video signal SigV inputted from the image pickup device 20c and extracts the joint line 4b. Then, when the misalignment (junction deviation ΔX) between the center of the image and the joint line 4b exceeds a predetermined level, the control device 30 determines that the junction deviation ΔX is generated between the joining head 20 and the joint line 4b, and corrects the junction deviation ΔX. Specifically, the control device 30 controls the robot main body 10 to move the joining head 20 in the direction of the joint line 4b. Thus, the junction deviation ΔX is converged toward zero and the joining head 20 moves accurately along the joint line 4b. Therefore, the members to be joined 4 are joined together by friction stir welding along the joint line 4b. That is, since the area where friction stir welding is performed is not largely away from the joint line 4b, high-quality friction stir welding is achieved.

In friction stir welding, the joining head 20 moves along the joint line 4b in the state where the joining tool 2 attached to the joining head 20 shown in FIG. 2 is rotating and where the pin part 2b formed in the joining tool 2 is inserted in the members to be joined 4. Then, due to the reaction force received by the rotating pin part 2b from the members to be joined 4, the Coriolis force P1 (see FIG. 5) causing the junction deviation ΔX between the joining head 20 and the joint line 4b is generated.

If the friction stir welding device 1 is large, the friction stir welding device 1 can restrain the Coriolis force P1 with its large mass and can move the joining head 20 without generating the junction deviation ΔX between the joining head 20 and the joint line 4b (or in the state where the junction deviation ΔX is small).

For example, in the friction stir welding device 1 in Example 1, the joining head 20 is attached to the robot main body 10. The robot main body 10 is small-sized and lightweight in order to efficiently move the moving parts such as the lower arm 10b and the upper arm 10c. Therefore, the joining head 20 tends to be displaced by the Coriolis force P1 generated by the rotation of the pin part 2b, and the junction deviation ΔX tends to occur between the joining head 20 and the joint line 4b.

Thus, the control device 30 in Example 1 is configured to be able to correct the junction deviation ΔX generated between the joining head 20 and the joint line 4b. Thus, even with the friction stir welding device 1 (see FIG. 1) in which the joining head 20 is attached to the small-sized and lightweight robot main body 10, friction stir welding accurately along the joint line 4b is possible and high-quality friction stir welding is possible.

Also, since the miniaturization of the friction stir welding device 1 is possible, for example, a portable friction stir welding device 1 with a high degree of freedom in installation can be provided.

Also, the control device 30 controlling the friction stir welding device 1 in Example 1 monitors the amount of insertion of the tool λ by monitoring the current (motor drive current Im) supplied to the main shaft motor 3. Then, friction stir welding of the members to be joined 4 can be performed in such a way that the amount of insertion of the tool λ is maintained within a predetermined proper range of insertion. Therefore, the amount of insertion of the pin part 2b into the members to be joined 4 is kept constant and high-quality friction stir welding is possible.

Also, as shown in FIG. 12, the friction stir welding device 1a in Example 4 has the lift device 50. Then, the joining head 20 is attached to the robot main body 10 via the lift device 50. Therefore, the control device 30 can maintain the amount of insertion of the tool λ at a constant level by controlling the lift device 50.

Since the lift device 50 can be driven with less energy (electric power) than the robot main body 10, the energy that is needed to maintain the amount of insertion of the tool λ at a constant level is reduced.

It should be noted that the invention is not limited to the examples above. For example, the examples above are described in detail in order to explain the invention intelligibly. The invention is not necessarily limited to having all of the configurations described above.

Also, a part of the configuration in one example can be replaced by the configuration in another example. Moreover the configuration in one example can be added to the configuration in another example.

In addition, the invention is not limited to the examples above and suitable design changes can be made without departing from the scope of the invention.

For example, the joining head 20 (see FIG. 2) of the friction stir welding device 1 (see FIG. 1) described in Examples 1 to 3 is provided with the image pickup device 20c (see FIG. 2). Also, the image processing unit 30d (see FIG. 4) of the control device 30 detects the misalignment between the joint line 4b (see FIG. 2) and the joining head 20, based on the video signal SigV inputted from the image pickup device 20c.

This configuration is not limiting. A configuration in which a laser beam is cast onto the members to be joined 4 (see FIG. 2) so as to detect the joint line 4b (see FIG. 2) can be employed.

For example, a contactless distance meter (not illustrated) which casts a laser beam onto the members to be joined 4 (see FIG. 2) and thus measures the distance from the members to be joined 4 is provided forward in the direction of movement of the joining head 20 (see FIG. 2). Since the joint line 4b (see FIG. 2) is a recessed part on the surfaces 4a (see FIG. 2) of the members to be joined 4, the distance from this part to the distance meter is longer. The control device 30 (see FIG. 4) can detect the misalignment between the joint line 4b and the joining head 20 by extracting the part (recessed part) with a longer distance from the distance meter, as the joint line 4b.

With such a configuration, the image pickup device 20c (see FIG. 2) and the image processing unit 30d (see FIG. 4) are not needed and the structure of the friction stir welding device 1 (see FIG. 1) can be simplified.

Also, the image processing unit 30d (see FIG. 4) outputs the position correction signal Sig2 when the junction deviation ΔX reaches the deviation limit value ΔXmax, as shown in FIG. 5. This configuration is not limiting. The image processing unit 30d may be configured to output the position correction signal Sig2 indicating the magnitude of the junction deviation ΔX when the junction deviation ΔX becomes greater than zero. In this case, the control unit 30a (see FIG. 4) can acquire the magnitude of the junction deviation ΔX, based on the position correction signal Sig2. Therefore, the control device 30 (see FIG. 4) can move the joining head 20 (see FIG. 2) in such a way that the junction deviation ΔX is constantly zero, and can effectively resolve the misalignment generated between the joint line 4b (see FIG. 2) and the joining head 20.

Also, the robot main body 10 (see FIG. 1) in Examples 1 to 7 has six-axis degrees of freedom. This configuration is not limiting and the degree of freedom of the robot main body 10 is not limited. For example, the robot main body 10 may have five-axis or fewer degrees of freedom, or may have seven-axis or more degrees of freedom.

REFERENCE SIGNS LIST

1 friction stir welding device
2 joining tool
2b pin part
3 main shaft motor (electric motor)
4 members to be joined
4b joint line
10 robot main body (drive device)
20 joining head
20c image pickup device (deviation detection device)
22 distance meter (distance measuring device)
30 control device
30d image processing unit (deviation detection device)
50 lift device
Im motor drive current
Sig4 distance signal
ΔX junction deviation (deviation)
λ amount of insertion of tool (amount of insertion of pin part)

The invention claimed is:

1. A friction stir welding device comprising:
a joining head attached to a wrist head of a robot main body having multi-axis degrees of freedom;
a drive device having the robot main body and capable of moving the joining head along a joint line where two members to be joined are joined together;
a control device which supplies a motor drive current to an electric motor provided for the joining head, thus inserts a pin part of a joining tool into the members to be joined while rotating the joining tool, and also controls the drive device in such a way that the joining head moves along the joint line, thus performing friction stir welding of the two members to be joined; and
a deviation detection device which detects a junction deviation which is a deviation between the joining head that is moving and a direction along the joint line,
wherein the control device is configured to output to the drive device a position correction signal with a different polarity according to a difference in direction of misalignment between the joining head and the joint line, for moving the joining head in a direction toward the joint line and resolving the junction deviation, and thus moves the joining head toward the joint line, until a time the junction deviation becomes zero, said control device to output when the junction deviation exceeds a deviation limit value which is a predetermined maximum deviation at the time of the friction stir welding, and
wherein the control device is configured to stop outputting the position correction signal to the drive device until the next time the junction deviation exceeds the deviation limit value, said control device to stop outputting when the junction deviation becomes zero.

2. The friction stir welding device according to claim 1, wherein
the drive device is configured to be able to move the joining head in directions toward and away from the members to be joined, and
the control device performs friction stir welding of the members to be joined, while controlling the drive device in such a way as to maintain the amount of insertion of the pint part into the members to be joined, within a predetermined proper range of insertion.

3. The friction stir welding device according to claim 2, wherein
the control device maintains the amount of insertion of the pin part within the proper range of insertion, based on the motor drive current.

4. The friction stir welding device according to claim 3, wherein
the control device determines that the amount of insertion of the pin part is smaller than a predetermined proper range of insertion when the motor drive current is smaller than a predetermined proper range of current, and determines that the amount of insertion of the pin part is greater than the proper range of insertion when the motor drive current is greater than the predetermined proper range of current, and thus maintains the amount of insertion of the pin part within the proper range of insertion.

5. The friction stir welding device according to claim 2, comprising
a distance measuring device which outputs a distance signal obtained by measuring a distance from the joining head to the members to be joined,
wherein the control device maintains the amount of insertion of the pin part within the predetermined proper range of insertion, based on the distance signal.

6. The friction stir welding device according to claim 1, wherein
the robot main body is configured to be able to move the joining head in a direction along the joint line.

7. The friction stir welding device according to claim 2, wherein
the drive device is configured by having a lift device capable of moving the joining head in directions toward and away from the members to be joined, attached to the robot main body,
the robot main body is configured to be able to move the joining head in a direction along the joint line, and
the control device controls the lift device to move the joining head in the case of moving the joining head in the directions toward and away from the member to be joined.

8. The friction stir welding device according to claim 2, wherein
the robot main body is configured to be able to move the joining head in a direction along the joint line and to move the joining head in directions toward and away from the members to be joined.

9. The friction stir welding device according to claim 1, wherein
the robot main body holds the joining head with six-axis degrees of freedom.

10. The friction stir welding device according to claim 1, wherein the deviation detection device comprises:
an image pickup device which is arranged forward in a direction of movement of the joining head and picks up an image of a boundary between the two members to be joined or an edge of one of the two members to be joined that is ahead of the joining head in the direction of movement, as the joint line; and
an image processing unit which inputs the joint line whose image is picked up by the image pickup device, as a video signal, and the image processing unit aligns the joint line with a center of an image pickup range of the image pickup device when the junction deviation is zero before the joining head starts moving, and detects misalignment between the joint line and the center of the image pickup range as the junction deviation after the joining head starts moving.

11. A friction stir welding method at the time when a friction stir welding device performs friction stir welding of the members to be joined, the friction stir welding comprising a joining head attached to a wrist head of a robot main body having multi-axis degrees of freedom, a drive device having the robot main body and capable of moving the joining head along a joint line where two members to be joined are joined together, and a control device which controls the drive device, the method comprising:

a procedure of detecting, by a deviation detection device, a junction deviation which is a deviation between the joining head that is moving and a direction along the joint line; and a procedure of configuring the control device to output to the drive device a position correction signal with a different polarity according to a difference in direction of misalignment between the joining head and the joint line, for resolving the junction deviation, and thus moving the joining head toward the joint line, until a time the junction deviation becomes zero, said control device to output when the junction deviation exceeds a deviation limit value which is a predetermined maximum deviation at the time of the friction stir welding, and a procedure of configuring the control device to stop outputting the position correction signal to the drive device until the next time the junction deviation exceeds the deviation limit value, and thus performing friction stir welding of the members to be joined while moving the joining head in a direction toward the joining line, said control device to stop outputting when the junction deviation becomes zero.

12. The friction stir welding method according to claim 11, comprising a procedure of maintaining, by the control device, the amount of insertion into the members to be joined of a pin part of a joining tool attached to the joining head, within a predetermined proper range of insertion at the time of friction stir welding.

13. The friction stir welding method according to claim 12, wherein the procedure of maintaining the amount of insertion of the pin part within the predetermined proper range of insertion is a procedure of maintaining, by the control device, the amount of insertion of the pin part within the proper range of insertion, based on a motor drive current supplied to an electric motor which rotates the joining tool.

14. The friction stir welding method according to claim 12, wherein the procedure of maintaining the amount of insertion of the pin part within the proper range of insertion is a procedure of maintaining, by the control device, the amount of insertion of the pin part within the predetermined proper range of insertion, based on a distance signal obtained by measuring a distance from the joining head to the members to be joined, by a distance measuring device provided in the joining head.

* * * * *